US012571371B2

(12) United States Patent
D'Amato et al.

(10) Patent No.: US 12,571,371 B2
(45) Date of Patent: Mar. 10, 2026

(54) METHOD AND SYSTEM FOR PREDICTIVE CONTROL OF A WIND TURBINE

(71) Applicant: General Electric Renovables España, S.L., Barcelona (ES)

(72) Inventors: Fernando Javier D'Amato, Avon, CT (US); Kalpesh Singal, Ballston Spa, NY (US); Su Liu, Niskayuna, NY (US); Luca Vita, Barcelona (ES); Hema K Achanta, Niskayuna, NY (US); Pedro Arroyo Beltri, Barcelona (ES)

(73) Assignee: GE Vernova Renovables Espana, S.L., Barcelona (ES)

( * ) Notice: Subject to any disclaimer, the term of this patent is extended or adjusted under 35 U.S.C. 154(b) by 0 days.

(21) Appl. No.: 18/978,062

(22) Filed: Dec. 12, 2024

(65) Prior Publication Data

US 2025/0198379 A1      Jun. 19, 2025

(30) Foreign Application Priority Data

Dec. 14, 2023      (EP) .................................... 23383299

(51) Int. Cl.
 *F03D 7/04*      (2006.01)
 *F03D 7/02*      (2006.01)
(52) U.S. Cl.
 CPC .............. *F03D 7/045* (2013.01); *F03D 7/02* (2013.01); *F03D 7/0224* (2013.01); *F03D 7/028* (2013.01);
(Continued)
(58) Field of Classification Search
 CPC ............................... F03D 7/045; F03D 7/0224
 See application file for complete search history.

(56) References Cited

U.S. PATENT DOCUMENTS 9,719,494 B2      8/2017   Prats Mustaros et al.
10,461,540 B2    10/2019   Ghaemi et al.
(Continued)

FOREIGN PATENT DOCUMENTS

EP          1911968 A1      4/2008

OTHER PUBLICATIONS

European Search Report & Opinion EP23383299 on May 29, 2024.
(Continued)

*Primary Examiner* — Courtney D Heinle
*Assistant Examiner* — John S Hunter, Jr.
(74) *Attorney, Agent, or Firm* — Dority & Manning, P.A.

(57)          ABSTRACT

A method for controlling a wind turbine having a plurality of actuators includes receiving operational data of the wind turbine and determining an operational state thereof. The method also includes using a control model to predict potential operational states depending on operation of the actuators over a finite period of time. The control model includes an aeroelastic model to determine loads based on the operational data. The control model further includes a strength calculation module to calculate secondary load parameters from the loads, constraints being defined for the secondary load parameters. The method further includes optimizing a cost function over an optimization period of time, subject to the constraints, to determine an optimum trajectory comprising commands for the actuators. The method further includes using the first commands of the optimum trajectory to control the actuators.

19 Claims, 8 Drawing Sheets

(52) U.S. Cl.
CPC ... *F05B 2220/30* (2013.01); *F05B 2270/1032*
(2013.01); *F05B 2270/1033* (2013.01); *F05B*
*2270/706* (2013.01)

(56) References Cited

U.S. PATENT DOCUMENTS

| | | | |
|---|---|---|---|
| 10,691,087 B2 | 6/2020 | D'Amato et al. | |
| 2018/0171975 A1* | 6/2018 | Röhm | B64C 3/46 |
| 2020/0378361 A1 | 12/2020 | Hovgaard et al. | |
| 2021/0115895 A1 | 4/2021 | D'Amato et al. | |
| 2022/0334540 A1 | 10/2022 | D'Amato et al. | |
| 2022/0345468 A1 | 10/2022 | Yan et al. | |
| 2023/0077025 A1 | 3/2023 | Fu et al. | |
| 2024/0401565 A1 | 12/2024 | D'Amato et al. | |

OTHER PUBLICATIONS

Boyano et al., Delamination Fracture Behavior of Unidirectional Carbon Reinforced Composites Applied to Wind Turbine Blades, 14-00593, Materials, vol. 14, No. 3, 2021, 16 Pages. https://doi.org/10.3390/mal4030593.

Feodosyev, Strength of Materials, Hardcover Book, MIR Publishers, 1968, 570 Pages. https://www.amazon.com/Strength-Materials-V-Feodosvev/dp/0714700487.

Friis et al., Repetitive Model Predictive Approach to Individual Pitch Control of Wind Turbines, 2011 50th IEEE Conference on Decision and Control and European Control Conference, 2011, 3664-3670. https://ieeexplore.ieee.org/document/6160948.

Hearn, Mechanics of Materials, International Series on Materials Science and Technology, vol. 1, Hardcover Book, Pergamon International Library of Science, Technology, Engineering and Social Studies, 1977, 643 Pages. https://doi.org/10.1002/crat.2170240610.

Hussain et al., Model Predictive Control of Wind Turbine with Aero-Elastically Tailored Blades, Journal of Physics: Conference Series, vol. 2265, 2022, 13 pages. https://iopscience.iop.org/article/10.1088/1742-6596/2265/3/032084/pdf.

Ma et al., Buckling Analysis for Wind Turbine Tower Design: Thrust Load Versus Compression Load Based on Energy Method, vol. 13, No. 20, Energies, 2020, 5302, 33 Pages https://www.mdpi.com/1996-1073/13/20/5302.

Sanchez et al., Health-Aware Model Predictive Control of Wind Turbines Using Fatigue Prognosis, International Journal of Adaptive Control and Signal Processing, vol. 32, Issue 4, 2017, 614-627. https://onlinelibrary.wiley.com/doi/abs/10.1002/acs.2784.

Timoshenko et al., Theory of Elasticity, Hardcover Book Engineering Societies Monographs, McGraw-Hill, 1970, 591 pages. https://www.amazon.com/Theory-Elasticity-S-P-Timoshenko/dp/B0000EG6BD.

* cited by examiner

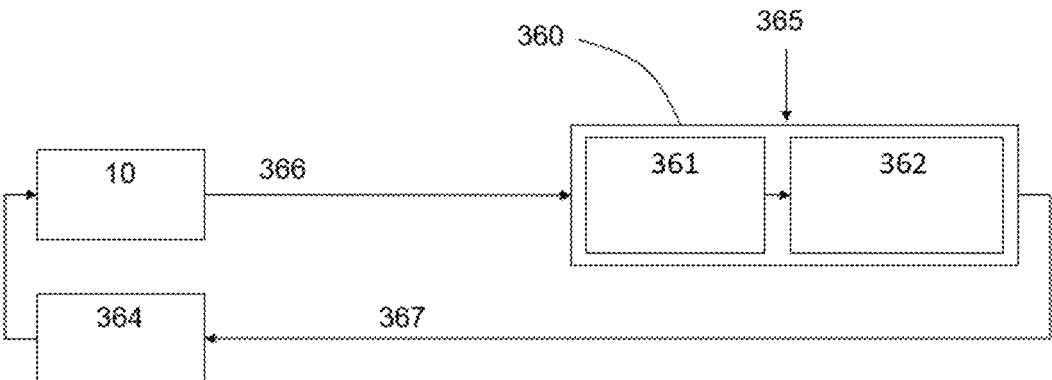

Fig. 3

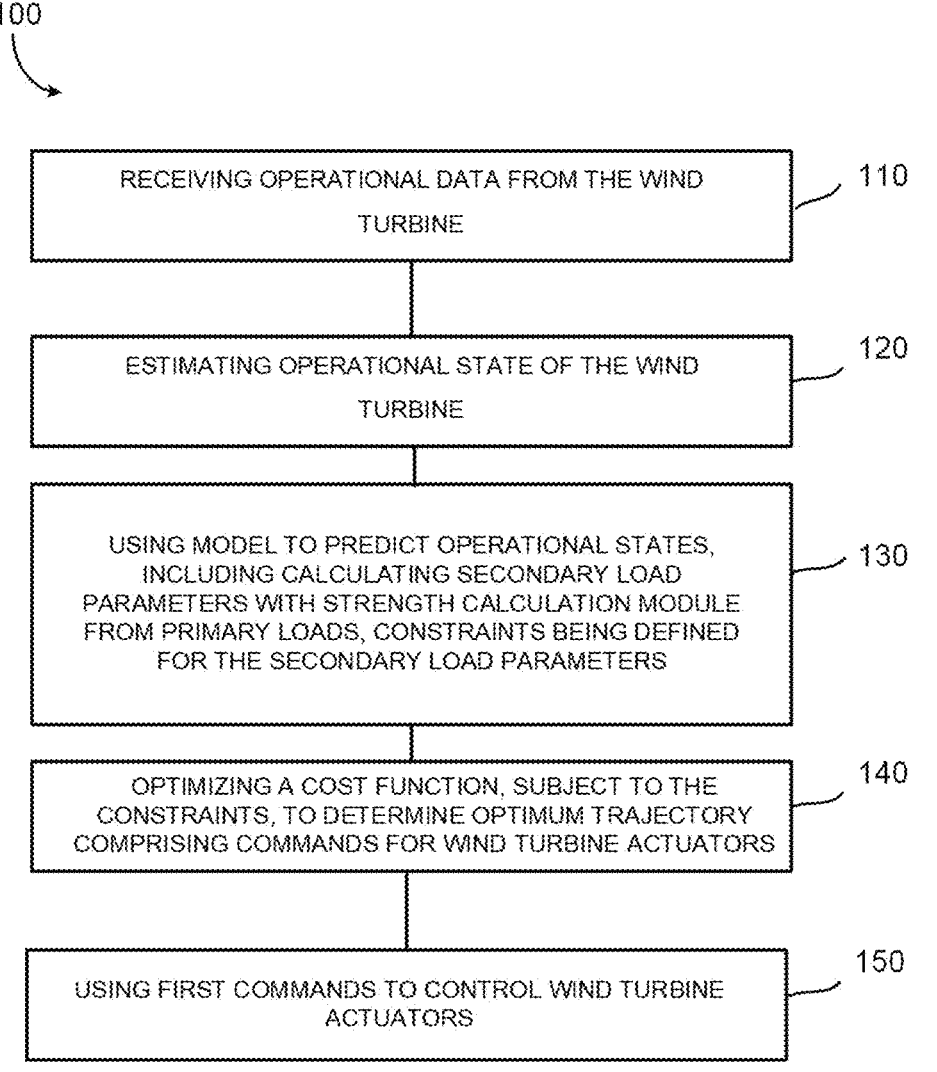

100

RECEIVING OPERATIONAL DATA FROM THE WIND TURBINE — 110

ESTIMATING OPERATIONAL STATE OF THE WIND TURBINE — 120

USING MODEL TO PREDICT OPERATIONAL STATES, INCLUDING CALCULATING SECONDARY LOAD PARAMETERS WITH STRENGTH CALCULATION MODULE FROM PRIMARY LOADS, CONSTRAINTS BEING DEFINED FOR THE SECONDARY LOAD PARAMETERS — 130

OPTIMIZING A COST FUNCTION, SUBJECT TO THE CONSTRAINTS, TO DETERMINE OPTIMUM TRAJECTORY COMPRISING COMMANDS FOR WIND TURBINE ACTUATORS — 140

USING FIRST COMMANDS TO CONTROL WIND TURBINE ACTUATORS — 150

Fig. 4

METHOD AND SYSTEM FOR PREDICTIVE CONTROL OF A WIND TURBINE

The present disclosure relates to wind turbines, and more particularly, to methods and systems for controlling wind turbines with a predictive controller.

BACKGROUND

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades. Said rotation generates a moment that is normally transmitted through a rotor shaft to a generator, either directly ("directly driven" or "gearless") or through the use of a gearbox. This way, the generator produces electricity which can be supplied to the electrical grid.

Variable speed wind turbines are commonly controlled by varying the generator torque and the pitch angle of the blades. In general, one or more control systems are arranged to determine actuator signals to vary generator torque and pitch angle. In general, wind turbines are controlled so as to capture maximum power from the wind so that maximum output power, for the prevailing wind conditions, is generated.

Nevertheless, the structure and components of a wind turbine undergo multiple loads of different magnitudes and frequencies during operation. In order to ensure structural integrity and proper operation of the wind turbine, such loads need to be maintained within certain limits which define the operational limits, e.g. maximum rotational speed or maximum electromagnetic torque, of the wind turbine. Consequently, it is also an object of the control systems to control the actuators such that the wind turbine remains within operational limits.

Thus, the controller or control system is an essential part of a wind turbine system, as the ability to capture energy from the wind and the cost of the wind turbine are highly dependent on the ability of the controller to mitigate loads in wind turbine components such as, but not limited to, blades, hub, tower or bearing structures. Different control strategies have been used for the control of wind turbines. These include classical feedback controllers of the PID type, which have been extensively used and have provided reliable operation. Nevertheless, wind turbines are increasingly complex systems that operate in a varying environment, so advanced control strategies enabling control of systems with multiple control variables are also proposed. Among advanced modern control strategies, Model Predictive Control (MPC) methods are particularly well suited for wind turbines because they can handle multivariable control problems while accounting for process constraints. Thus, MPC controllers can manage input (e.g. blade pitch angle or generator torque) constraints and output or operability constraints (e.g., rotational speed, generated electrical power) while taking structural loads (e.g. blade root moments, tower base moments) into account so as to maintain stability of the system while optimizing output power.

In order to determine the control actions, MPC uses a mathematical model of the wind turbine to predict the future behavior, i.e. the output variables, of the wind turbine over a certain time horizon after considering the current state of the wind turbine. The predicted behavior of the wind turbine is not only dependent on the current state of the wind turbine but also on the evolution of the controllable variables and of the environmental conditions over the prediction period. The MPC controller provides optimal control actions for the actuators of the wind turbine as an output, which ensure that the wind turbine tracks the desired references. To this end, the MPC controller comprises an optimizer that solves an online optimization problem at each control step. The optimization problem comprises the minimization of a cost function, J, over the prediction horizon subject to some constraints. The cost function penalizes deviations of the output (also referred to as dependent or controlled) variables from reference values, e.g. output power or speed references. It also penalizes excessive activity or changes on the input (also referred to as independent or controllable) variables. As recognized by those skilled in the art, both the cost function and the constraints can be defined in dependence of specific objectives and/or requirements of the control problem.

The competitiveness of a wind turbine design is dependent on the ability of the controller to handle loads on turbine components. In particular, when using MPC controllers, loads can be handled as constraints in the optimization problem. Thus, constraints are introduced to account for the system limits. Nevertheless, online strength assessment of each component at each operating condition is not practical because of the large number of detailed calculations, i.e. large computational power, required. For this reason, load assessment during wind turbine design is typically simplified by selecting a specific limited number of components and component locations, e.g. blade root. Besides, a limited number of secondary load parameters for those specific locations and components, e.g. blade flap moment at the blade root, are also selected. This known simplified approach attempts to capture the full loads envelope.

However, this known approach may suffer from at least two limitations. On one hand, a safety problem may arise if a certain loading condition is reached which exceeds the strength limit of a certain component that is not considered in the specific components and secondary load parameters considered. In such case, the controller may be unable to react and take the corresponding action to mitigate loads so as to keep the wind turbine within its operational limits. A derived second limitation of this known approach relates to the use of excessive, i.e. too large, safety margins to prevent the previously mentioned problem. Thus, safety margins may be used to account for the uncertainty in the strength limits resulting from, e.g. not considering the most critical component or the most critical load condition in the simplified approach. Although this approach may indeed reduce safety concerns, the selection of high safety margins can result in a wind turbine design being too conservative and, consequently, too expensive.

The present disclosure seeks to provide improved methods for controlling a wind turbine with a predictive controller so as to reduce at least some of the aforementioned limitations.

SUMMARY

In an aspect of the present disclosure, a method for controlling a wind turbine having a plurality of wind turbine actuators is provided. The method comprises the following steps. First, the method comprises receiving operational data of the wind turbine. Based on the received operational data, an operational state of the wind turbine is estimated. The method further comprises using a control model to predict potential operational states of the wind turbine depending on operation of the wind turbine actuators over a finite period of time. The control model comprises a predictive aeroelastic module to determine primary loads based on the received operational data. The control model further comprises a strength calculation module to calculate one or more secondary load parameters based on the primary loads, constraints being defined for the secondary load parameters. The method comprises optimizing a cost function over a finite optimization period of time, subject to the constraints, to determine an optimum trajectory comprising commands for the wind turbine actuators. Then, the method comprises using the first commands of the determined optimum trajectory to control the wind turbine actuators.

According to this aspect of the disclosure, a method is provided that allows an improved control of a wind turbine. Operational limits of the wind turbine are not exceeded and output power is optimized. By using a control model of the wind turbine, use is made of the predictive capability of the model to optimize future control actions.

The method optimizes a cost function over an optimization period of time so that optimal actions for the wind turbine actuators are defined. In an example of the disclosure, the optimization period may coincide with the period of time used for the prediction of the potential operational states of the wind turbine. In other examples, different periods of time may be used for the optimization and for the prediction. The cost function allows combination and achievement of multiple objectives. More particularly, optimization of the cost function is subject to constraints, which are representative of different system limits.

The model comprises a strength calculation module that allows calculating secondary load parameters based, at least in part, on the primary loads determined by a predictive aeroelastic model. On the one hand, the secondary load parameters correspond to the most relevant loads that truly determine the limiting conditions of the wind turbine. On the other hand, the primary loads are provided by the predictive aeroelastic model and they correspond to basic loads obtained from simplified calculations, which may be given by, e.g. bending moments at selected interfaces between different selected components of the wind turbine and/or forces at selected locations of specific components. In some cases, basic loads may be expressed as deflections of certain components.

Constraints are defined for the secondary load parameters. The calculated values of the secondary load parameters as well as the corresponding constraints are then used in combination with the cost function to conform the optimization problem to be solved by the MPC controller. At least some of the constraints used in the optimization process are related to secondary load parameters calculated in the strength calculation module. As a result, optimum commands for the wind turbine actuators are provided which take into account the most relevant loads affecting the operation of the wind turbine.

Unlike in previously known control methods, a closer representation of the truly relevant loads in real time is used. Said relevant loads are characterized by the detailed secondary load parameters calculated by the strength calculation module. Indeed, the true limiting conditions are considered by the control method instead of using a limited set of specific loads at specific locations. The set of specific loads at specific locations may correspond to a set of basic loads such as those provided by a simplified predictive aeroelastic model. Those basic loads may be aligned with, e.g. design load cases derived from applicable standards in the field. Nevertheless, those basic loads may not be representative of the true system limits. For this reason, control systems based on such basic loads typically require using highly conservative safety margins. According to the present disclosure, more accurate safety information is used in the control of the wind turbine as secondary load parameters, indicative of the true limiting conditions, are calculated and used by the controller. As a result, improved load handling is obtained and less conservative wind turbine designs are enabled.

In another aspect of the disclosure, a controller for a wind turbine is provided. The control system is characterized in that it is configured to carry out a method according to the previously mentioned aspect.

According to this further aspect of the disclosure, a controller or control system can be arranged in a wind turbine. The control system comprises the hardware needed to run the method for controlling a wind turbine. More particularly, the control system includes the hardware to store the model of the wind turbine, including the strength calculation module, and the optimization algorithm including the cost function and the constraints. In this manner, the control system allows optimum control of a wind turbine by enabling the execution of the previously mentioned method. Accordingly, the controller is such that improved load handling is obtained and violations of design limits of wind turbines components during operation are avoided. An improved load handling enables increased annual energy production (AEP) by taking into account the true limiting factors. Indeed, by using more accurate constraints, the controller may not need to add conservative limits to account for the uncertainty. As a result, the wind turbine may, e.g. temporarily use lower pitch angles or larger generator torque to capture additional energy than otherwise possible. Furthermore, a wind turbine incorporating a control system according to this aspect of the disclosure may be designed in a more competitive manner by avoiding costs incurred when applying excessively conservative limits to the different components.

Throughout this disclosure, the term secondary load parameter is interpreted as referring to any detailed magnitude, obtained by the strength calculation module, and representative of a true limiting load suffered by one or more wind turbine components. Thus, as non-limiting examples, a secondary load parameter may refer to a force or a moment experienced by a wind turbine component but it may also refer to a derived parameter, such as a stress or a strain, in a wind turbine component. Secondary load parameters may also be defined after combination of other secondary load parameters. Secondary load parameters are obtained with a strength calculation module after taking into account primary loads. Throughout this disclosure, primary loads refer to the basic loads obtainable from simplified load calculations in a predictive aeroelastic control model. Primary loads may include e.g. bending moments at the interface of selected wind turbine components or forces at selected locations of specific components. Specifically, examples of such primary loads may include blade root flap-wise and edge-wise moments or tower base nodding moment. Primary loads may also be expressed as deflections of certain components.

BRIEF DESCRIPTION OF THE DRAWINGS

Non-limiting examples of the present disclosure will be described in the following, with reference to the drawings, in which:

FIG. 3 show an example of a control system and a wind turbine;

FIG. 4 shows a flowchart of an example of a method for controlling a wind turbine;

DETAILED DESCRIPTION OF EXAMPLES

Figure 1:
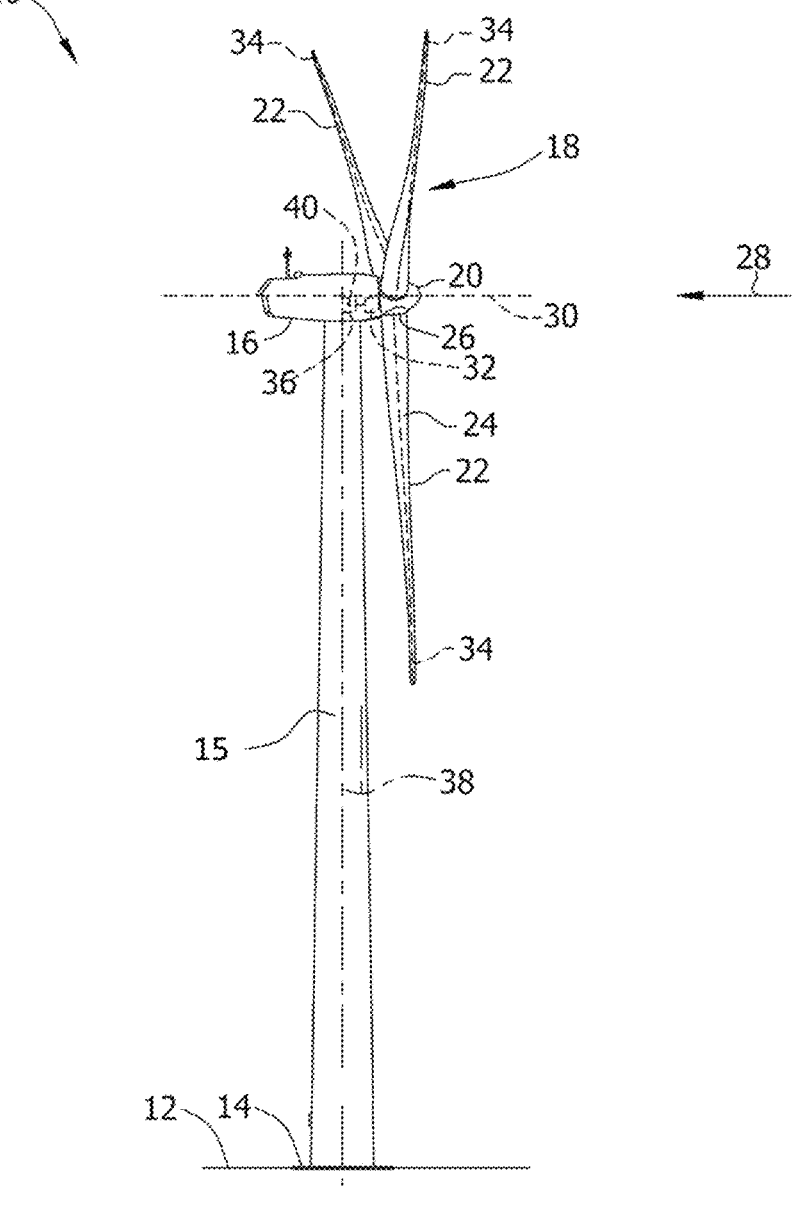
FIG. 1 illustrates a perspective view of one example of a wind turbine.

Reference now will be made in detail to embodiments, one or more examples of which are illustrated in the drawings. Each example is provided by way of explanation only, not as a limitation. In fact, it will be apparent to those skilled in the art that various modifications and variations can be made in the present disclosure. For instance, features illustrated or described as part of one example can be used with another example to yield a still further example. Thus, it is intended that the present disclosure covers such modifications and variations as come within the scope of the appended claims and their equivalents.

FIG. 1 is a perspective view of an example of a wind turbine 10. In the example, the wind turbine 10 is a horizontal-axis wind turbine. Alternatively, the wind turbine 10 may be a vertical-axis wind turbine. In the example, the wind turbine 10 includes a tower 15 that extends from a support system 14 on a ground 12, a nacelle 16 mounted on tower 15, and a rotor 18 that is coupled to nacelle 16. The rotor 18 includes a rotatable hub 20 and at least one rotor blade 22 coupled to and extending outward from the hub 20. In the example, the rotor 18 has three rotor blades 22. In an alternative example, the rotor 18 includes more or less than three rotor blades 22. The tower 15 may be fabricated from tubular steel to define a cavity (not shown in FIG. 1) between a support system 14 and the nacelle 16. In an alternative example, the tower 15 is any suitable type of a tower having any suitable height. According to an alternative, the tower can be a hybrid tower comprising a portion made of concrete and a tubular steel portion. Also, the tower can be a partial or full lattice tower.

The rotor blades 22 are spaced about the hub 20 to facilitate rotating the rotor 18 to enable kinetic energy to be transferred from the wind into usable mechanical energy, and subsequently, electrical energy. The rotor blades 22 are mated to the hub 20 by coupling a blade root area 24 to the hub 20 at a plurality of load transfer regions 26. The load transfer regions 26 may have a hub load transfer region and a blade load transfer region (both not shown in FIG. 1). Loads induced to the rotor blades 22 are transferred to the hub 20 via the load transfer regions 26.

In examples, the rotor blades 22 may have a length ranging from about 15 meters (m) to about 90 m or more. Rotor blades 22 may have any suitable length that enables the wind turbine 10 to function as described herein. For example, non-limiting examples of blade lengths include 20 m or less, 37 m, 48.7 m, 50.2 m, 52.2 m or a length that is greater than 91 m. As wind strikes the rotor blades 22 from a wind direction 28, the rotor 18 is rotated about a rotor axis 30. As the rotor blades 22 are rotated and subjected to centrifugal forces, the rotor blades 22 are also subjected to various forces and moments. As such, the rotor blades 22 may deflect and/or rotate from a neutral, or non-deflected, position to a deflected position.

Moreover, a pitch angle of the rotor blades 22, i.e., an angle that determines an orientation of the rotor blades 22 with respect to the wind direction, may be changed by a pitch system 32 to control the load and power output by the wind turbine 10 by adjusting an angular position of at least one rotor blade 22 relative to wind vectors. Pitch axes 34 of rotor blades 22 are shown. During operation of the wind turbine 10, the pitch system 32 may particularly change a pitch angle of the rotor blades 22 such that the angle of attack of (portions of) the rotor blades are reduced, which facilitates reducing a rotational speed and/or facilitates a stall of the rotor 18.

In the example, a blade pitch of each rotor blade 22 is controlled individually by a wind turbine controller 36 or by a pitch control system 80. Alternatively, the blade pitch for all rotor blades 22 may be controlled simultaneously by said control systems.

Further, in the example, as the wind direction 28 changes, a nacelle 16 may be rotated about the longitudinal axis of the tower, i.e. about a yaw axis 38 to position the rotor blades 22 with respect to wind direction 28.

In the example, the wind turbine controller 36 is shown as being centralized within the nacelle 16, however, the wind turbine controller 36 may be a distributed system throughout the wind turbine 10, on the support system 14, within a wind farm, and/or at a remote-control center. The wind turbine controller 36 may include a processor 40 configured to perform some of the methods and/or steps described herein. Further, many of the other components described herein include a processor.

As used herein, the term "processor" is not limited to integrated circuits referred to in the art as a computer, but broadly refers to a controller, a microcontroller, a microcomputer, a programmable logic controller (PLC), an application specific, integrated circuit, and other programmable circuits, and these terms are used interchangeably herein. It should be understood that a processor and/or a control system can also include memory, input channels, and/or output channels.

A control system 36 may also include a memory, e.g. one or more memory devices. A memory may comprise memory element(s) including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s) 40, configure the controller 36 to perform, or trigger the performance of, various steps disclosed herein. A memory may also be configured to store data, e.g. from measurements and/or calculations.

Figure 2:
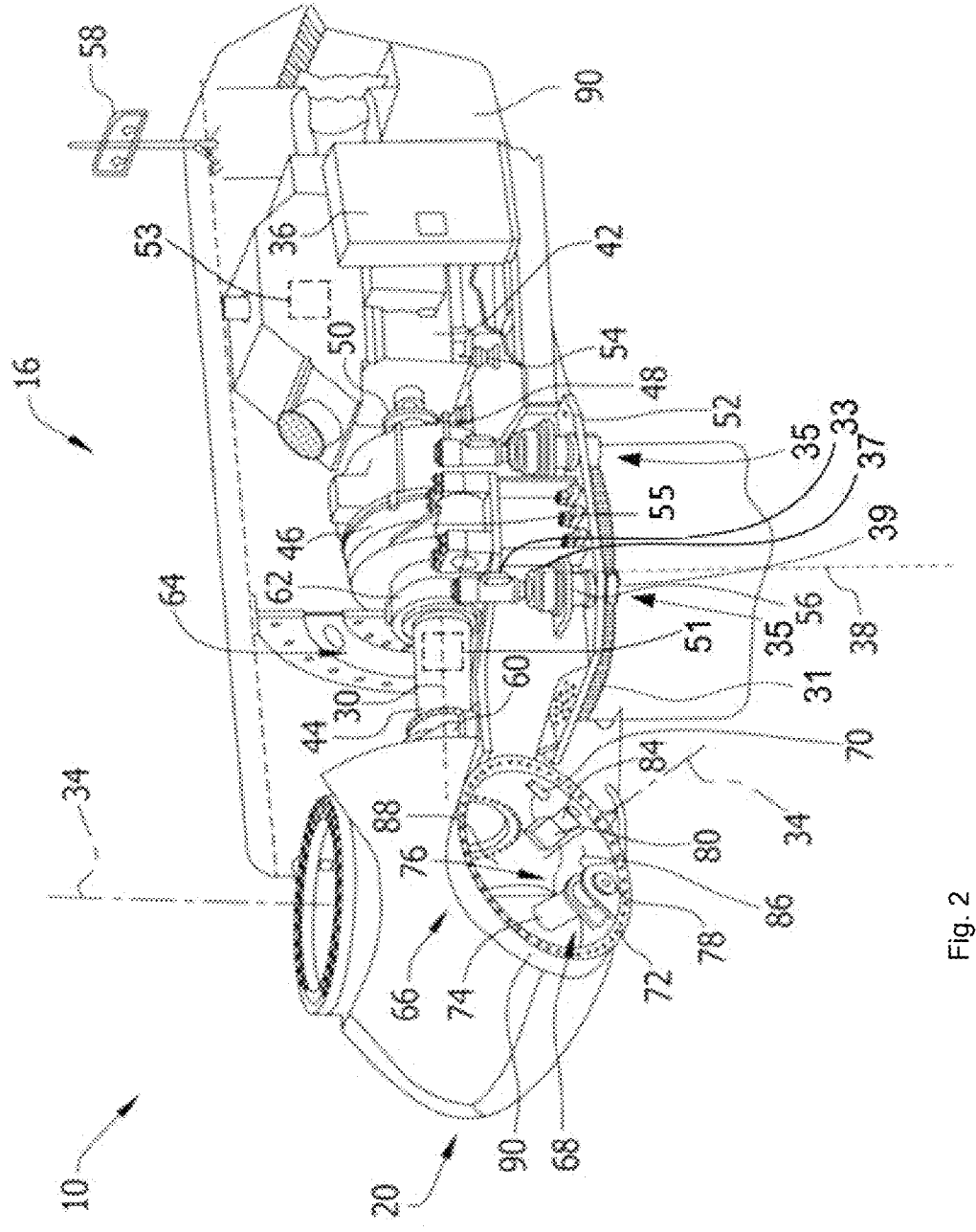
FIG. 2 illustrates a simplified, internal view of one example of the nacelle of the wind turbine of the FIG. 1.

FIG. 2 is an enlarged sectional view of a portion of the wind turbine 10. In the example, the wind turbine 10 includes the nacelle 16 and the rotor 18 that is rotatably coupled to the nacelle 16. More specifically, the hub 20 of the rotor 18 is rotatably coupled to an electric generator 42 positioned within the nacelle 16 by the main shaft 44, a gearbox 46, a high-speed shaft 48, and a coupling 50. In the example, the main shaft 44 is disposed at least partially coaxial to a longitudinal axis (not shown) of the nacelle 16. A rotation of the main shaft 44 drives the gearbox 46 that subsequently drives the high-speed shaft 48 by translating the relatively slow rotational movement of the rotor 18 and of the main shaft 44 into a relatively fast rotational movement of the high-speed shaft 48. The latter is connected to the generator 42 for generating electrical energy with the help of a coupling 50. Furthermore, a transformer 90 and/or suitable electronics, switches, and/or inverters may be arranged in the nacelle 16 in order to transform electrical energy generated by the generator 42 having a voltage between 400V to 1000 V into electrical energy having medium voltage (e.g. 10-35 KV). Said electrical energy is conducted via power cables from the nacelle 16 into the tower 15.

The gearbox 46, generator 42 and transformer 90 may be supported by a main support structure frame of the nacelle 16, optionally embodied as a main frame 52. The gearbox 46 may include a gearbox housing that is connected to the main frame 52 by one or more torque arms 55. In the example, the nacelle 16 also includes a main forward support bearing 60 and a main aft support bearing 62. Furthermore, the generator 42 can be mounted to the main frame 52 by decoupling support means 54, in particular in order to prevent vibrations of the generator 42 to be introduced into the main frame 52 and thereby causing a noise emission source.

Optionally, the main frame 52 is configured to carry the entire load caused by the weight of the rotor 18 and components of the nacelle 16 and by the wind and rotational loads, and furthermore, to introduce these loads into the tower 15 of the wind turbine 10. The rotor shaft 44, generator 42, gearbox 46, high-speed shaft 48, coupling 50, and any associated fastening, support, and/or securing device including, but not limited to, support frame 52, and forward support bearing 60 and aft support bearing 62, are sometimes referred to as a drive train 64.

In some examples, the wind turbine may be a direct drive wind turbine without gearbox 46. Generator 42 operate at the same rotational speed as the rotor 18 in direct drive wind turbines. They therefore generally have a much larger diameter than generators used in wind turbines having a gearbox 46 for providing a similar amount of power than a wind turbine with a gearbox.

The nacelle 16 also may include a yaw system which comprises a yaw bearing (not visible in FIG. 2) having two bearing components configured to rotate with respect to the other. The tower 15 is coupled to one of the bearing components and the bedplate or support frame 52 of the nacelle 16 is coupled to the other bearing component.

The yaw system may comprise an annular gear 31 and a yaw drive mechanism 56 that may be used to rotate the nacelle 16 and thereby also the rotor 18 about the longitudinal axis of the tower, i.e. about a yaw axis 38 to control the perspective of the rotor blades 22 with respect to the wind direction 28.

The yaw drive mechanism 56 may comprise a plurality of yaw drives 35 with a motor 33, a gearbox 37 and a pinion 39 for meshing with the annular gear 31 for rotating one of the bearing components with respect to the other. The annular gear 31 may comprise a plurality of teeth which engage with the teeth of the pinion 39. In the example of FIG. 2, the yaw drives 35 and the annular gear 31 are placed outside the external diameter of the tower. The teeth of the annular gear are outwardly orientated, but in other examples, the annular gear and yaw drives may be arranged at the inside of the tower.

In some examples, one of the yaw drives may be a "master", and the other drives may be "slaves" following the instructions of the master or adapting their operation to adapt to the master drive.

The wind turbine controller 36 may be communicatively coupled to the yaw drive mechanism 56 of the wind turbine 10 for controlling and/or altering the yaw direction of the nacelle 16 relative to the wind direction 28. As the direction of the wind 28 changes, the wind turbine controller 36 may be configured to control a yaw angle of the nacelle 16 about the longitudinal axis of the tower or yaw axis 38 to position the rotor blades 22, and therefore the rotor 18, with respect to the direction 28 of the wind, thereby controlling the loads acting on the wind turbine 10. For example, the wind turbine controller 36 may be configured to transmit control signals or commands to the yaw drive mechanism 56 of the wind turbine 10, via a yaw controller or direct transmission, such that the nacelle 16 may be rotated about the longitudinal axis of the tower or yaw axis 38 via a yaw bearing.

For positioning the nacelle 16 appropriately with respect to the wind direction 28, the nacelle 16 may also include at least one meteorological measurement system which may include a wind vane and anemometer. The meteorological measurement system 58 can provide information to the wind turbine controller 36 that may include wind direction 28 and/or wind speed.

In the example, the pitch system 32 is at least partially arranged as a pitch assembly 66 in the hub 20. The pitch assembly 66 includes one or more pitch drive systems 68 and at least one sensor 70. Each pitch drive system 68 is coupled to a respective rotor blade 22 (shown in FIG. 1) for modulating the pitch angel of a rotor blade 22 along the pitch axis 34. Only one of three pitch drive systems 68 is shown in FIG. 2.

In the example, the pitch assembly 66 includes at least one pitch bearing 72 coupled to hub 20 and to a respective rotor blade 22 (shown in FIG. 1) for rotating the respective rotor blade 22 about the pitch axis 34. The pitch drive system 68 includes a pitch drive motor 74, a pitch drive gearbox 76, and a pitch drive pinion 78. The pitch drive motor 74 is coupled to the pitch drive gearbox 76 such that the pitch drive motor 74 imparts mechanical force to the pitch drive gearbox 76. The pitch drive gearbox 76 is coupled to the pitch drive pinion 78 such that the pitch drive pinion 78 is rotated by the pitch drive gearbox 76. The pitch bearing 72 is coupled to pitch drive pinion 78 such that the rotation of the pitch drive pinion 78 causes a rotation of the pitch bearing 72.

Pitch drive system 68 is coupled to the wind turbine controller 36 for adjusting the pitch angle of a rotor blade 22 upon receipt of one or more signals from the wind turbine controller 36. In the example, the pitch drive motor 74 is any suitable motor driven by electrical power and/or a hydraulic system that enables pitch assembly 66 to function as described herein. Alternatively, the pitch assembly 66 may include any suitable structure, configuration, arrangement, and/or components such as, but not limited to, hydraulic cylinders, springs, and/or servomechanisms. In certain examples, the pitch drive motor 74 is driven by energy extracted from a rotational inertia of hub 20 and/or a stored energy source (not shown) that supplies energy to components of the wind turbine 10.

The pitch assembly 66 may also include one or more pitch control systems 80 for controlling the pitch drive system 68 according to control signals from the wind turbine controller 36, in case of specific prioritized situations and/or during rotor 18 overspeed. In the example, the pitch assembly 66 includes at least one pitch control system 80 communicatively coupled to a respective pitch drive system 68 for controlling pitch drive system 68 independently from the wind turbine controller 36. In the example, the pitch control system 80 is coupled to the pitch drive system 68 and to a sensor 70. During normal operation of the wind turbine 10, the wind turbine controller 36 may control the pitch drive system 68 to adjust a pitch angle of rotor blades 22.

According to an example, a power generator 84, for example comprising a battery and electric capacitors, is arranged at or within the hub 20 and is coupled to the sensor 70, the pitch control system 80, and to the pitch drive system 68 to provide a source of power to these components. In the example, the power generator 84 provides a continuing source of power to the pitch assembly 66 during operation of the wind turbine 10. In an alternative example, power generator 84 provides power to the pitch assembly 66 only during an electrical power loss event of the wind turbine 10. The electrical power loss event may include power grid loss or dip, malfunctioning of an electrical system of the wind turbine 10, and/or failure of the wind turbine controller 36. During the electrical power loss event, the power generator 84 operates to provide electrical power to the pitch assembly 66 such that pitch assembly 66 can operate during the electrical power loss event.

In the example, the pitch drive system 68, the sensor 70, the pitch control system 80, cables, and the power generator 84 are each positioned in a cavity 86 defined by an inner surface 88 of hub 20. In an alternative example, said components are positioned with respect to an outer surface of hub 20 and may be coupled, directly or indirectly, to the outer surface.

FIG. 3 illustrates a system comprising a wind turbine 10, a controller 360 and a wind turbine actuator system 364 The wind turbine actuator system 364 comprises a plurality of actuators, such as the above mentioned blade pitch systems 32, yaw drive mechanism 56 or electronics converter enabling torque control. Although depicted separately in FIG. 3 for illustration and explanation purposes, those actuators are physically arranged in the wind turbine 10 as is well understood by those skilled in the art. The controller 360 in this example comprises an estimator 361 and an MPC (Model Predictive Control) module 362. The controller 360 controls the wind turbine 10 so that the wind turbine 10 operates according to the one or more received reference signals 365, e.g. power output, while maintaining system limits. To this end, the controller 360 generates commands or commands 367 to control one or more wind turbine actuators in the wind turbine actuator system 364. Multiple wind turbine actuators may be present in the wind turbine 10. Specifically, in examples of the disclosure, actuator commands may comprise at least one of a blade pitch angle and a generator torque, which may be sent to the corresponding blade pitch drive systems 68 and power converter.

In order to control the wind turbine 10, the controller 360 may receive operational data 366 from the wind turbine 10.

The operational data 366 may be used to determine the operational state of the wind turbine 10. In examples of the disclosure, operational data may include the value of the blade pitch angles, output power, electrical torque, rotational speed of the wind turbine rotor, rotational speed of the electrical generator, tower top position, etc. Operational data 366 may be obtained via direct measurements with sensors. Nevertheless, in examples of the disclosure, operational data 366 may be obtained via virtual sensors. Thus, in examples of the disclosure, no direct measurement may be required. A virtual sensing system comprising a proper model may be used to calculate the value of the operational variable when no direct measurement of the same is available.

In examples of the disclosure, sensor measurements may be fed to a signal treatment module (not shown in FIG. 3), where they may be filtered and conditioned. An estimator 361 may be provided. The estimator 361 may comprise filter equations (e.g. extended Kalman filters) that may be used to calculate the most probable operational state of the wind turbine 10 based on the received operational data 366. The operational state may be dynamically determined at each control step.

As also shown in FIG. 3, the determined operational state may then be used by the MPC module 362. The MPC module 362 is responsible for defining the actuator commands based on the current operational state of the wind turbine 10 and on the control requirements. To this end, the MPC module 362 uses a model of the wind turbine 10. Details of the MPC module 362 will be provided with reference to FIGS. 5 and 6.

FIG. 4 shows a flowchart of an example of a method 100 for controlling a wind turbine 10 having a plurality of wind turbine actuators 364. The method 100 comprises steps 110-150. Step 110 comprises receiving operational data 366 of the wind turbine 10. Then, based on the received operational data 366, step 120 comprises estimating an operational state of the wind turbine 10. Step 130 comprises using a control model (370, in FIGS. 5 and 6) to predict potential operational states of the wind turbine depending on operation of the wind turbine actuators 364 over a finite period of time. The control model 370 comprises a predictive aeroelastic control model (371 in FIGS. 5 and 6) to determine primary loads (375 in FIGS. 5 and 6) based on the received operation data 366. The control model 370 further comprises a strength calculation module (372, in FIGS. 5 and 6) to calculate one or more secondary load parameters (374 in FIGS. 5 and 6) based on the primary loads 375 determined by the predictive aeroelastic control model 371, constraints being defined for the secondary load parameters 374. An optimum trajectory comprising commands for the wind turbine actuators is determined by optimizing a cost function over a finite period of time, subject to the constraints, in step 140. Finally, step 150 comprises using the first commands of the determined optimum trajectory to control the wind turbine actuators 364.

In an example of the disclosure, the method may comprise repeating the above mentioned steps 110-150 at consecutive control intervals. More specifically, steps 110-150 may be carried out at each control interval. In this manner, optimum control of the wind turbine 10 may be carried out in real-time so as to better react and adapt to varying environmental conditions and/or varying operating conditions of the wind turbine 10.

In examples of the disclosure, the method may comprise defining constraints not only for the secondary load parameters but also for one or more of the primary loads. Consequently, optimizing the cost function over a finite optimization period of time in these examples may also be subjected to the constraints defined for the primary loads. Thus, according to these examples, a combination of constraints associated to primary loads and to secondary load parameters may be employed to better capture the behavior of the wind turbine.

Furthermore, in examples of the disclosure, secondary load parameters may be related to extreme loads. In other examples, fatigue loads may also be considered in the definition of the secondary load parameters.

The operational state of the wind turbine 10, which is defined in step 120 of the method 100, may be defined by a plurality of variables referring to operational parameters of the wind turbine 10. Said variables may be expressed as a vector. As explained with reference to FIG. 3, the operational state may be obtained after taking into account direct sensor measurements or virtual sensor information. Furthermore, an estimator 361 may be used to determine the current operational state, thus reducing uncertainties associated to, e.g. noise. Different variables, i.e. different operational parameters, may be selected to define the operational state of the wind turbine 10. In an example of the disclosure, the operational state of the wind turbine 10 may be defined by:

$$x = \begin{bmatrix} \alpha(t) \\ \dot{\alpha}(t) \\ \omega(t) \\ \dot{\omega}(t) \\ T(t) \\ \dot{T}(t) \\ b(t) \\ \dot{b}(t) \\ t(t) \\ \dot{t}(t) \end{bmatrix}$$

Where a is the blade pitch angle, w is the rotational speed of the wind turbine rotor, and T is the electromagnetic torque of the generator, b is the blade deflection and t is the tower deflection. Time derivates for each of those parameters may also be included in the definition of the operational state.

The optimum trajectory to control the wind turbine actuators 364 comprises a time series of commands which may be described as a vector comprising the commands for the wind turbine actuators 364. According to the disclosure, the first value of the trajectory is directly provided to the wind turbine actuators 364. As with the definition of the operational state of the wind turbine 10, different trajectories may be envisaged in examples of the disclosure depending on the specific wind turbine actuators 364 (and on the specific parameters of those actuators) being considered. Specifically, the trajectories provide the list of controllable or independent variables that are used to dynamically control the behavior of the wind turbine 10. In an example of the disclosure, the optimum trajectory may comprise commands or commands for the blade pitch angles and for the generator torque:

$$u = \begin{bmatrix} \alpha_1(t) \\ \alpha_2(t) \\ \alpha_3(t) \\ T_r(t) \end{bmatrix}$$

where $a_i$ represents the reference for the pitch angle of blade "i" in the wind turbine 10 and $T_r$ corresponds to the reference for the electrical torque. In another example, the optimum trajectory may comprise commands for the rate of change of the blade pitch angles and for the generator torque.

Step 130 of the method comprises using a model of the wind turbine 10 to predict potential operational states of the wind turbine 10 depending on operation of the wind turbine actuators 364. In other words, a model is used to predict future trajectories, or time evolutions, of the operational state of wind turbine 10, which may be defined according to output or dependent variables as shown above. Said trajectories are dependent on the current operational state (as determined in step 120) and on the actuation on the controllable or independent variables (e.g. blade pitch or torque). Apart from controllable variables, the effect of uncontrollable independent variables may also be considered by the model in the form of disturbances. The determination of the potential trajectories includes the calculation of certain secondary load parameters 374, indicative of the predicted loading of selected components of the wind turbine 10.

The control model 370 comprises a predictive aeroelastic model 371 which is used to determine primary loads 375. The control model 370 comprises a further module, the strength calculation module 372, which is used to calculate the truly relevant secondary load parameters 374 determining the behavior of the wind turbine 10. By adding the strength calculation module 372, secondary load parameters 374 beyond those typically provided by the predictive aeroelastic model 371 can be calculated and used for the optimization problem. The strength calculation module 372 corresponds to a code used to calculate the secondary load parameters 374. It may be implemented as a separate or specific block or it may be included with other parts of the code. In other words, the strength calculation module 372 is depicted as an independent module in FIGS. 5 and 6 for illustrative purposes but the functionality of the strength calculation module 372 may be integrated with other parts of the code.

Out of the predicted trajectories for the operational state of the wind turbine 10, an optimum trajectory is obtained in step 140. To this end, a cost function is minimized, subject to a number of constraints. At least some of the constraints used in the optimization problem relate to the calculated secondary load parameters 374.

An example of a generic cost function is provided below:

$$J = \sum_{i=1}^{N} W_{x_i}(r_i - x_i)^2 + \sum_{i=1}^{M} W_{u_i}\Delta u_i^2$$

$x_i$: $i^{th}$ dependent or output operational variable
$r_i$: reference value for $i^{th}$ dependent or output variable
$u_i$: $i^{th}$ manipulated/independent/control variable
$W_{xi}$: weighting coefficient reflecting the relative importance of $x_i$
$W_{ui}$: weighting coefficient penalizing relative big deviations in $u_i$ In this example cost function, N dependent or output variables, $x_i$, are defined for the operational state of the wind turbine 10 and M independent or manipulated variables, $u_i$, are defined for the wind turbine actuators.

The first term in the cost function, J, corresponds to the output or dependent variables and it ensures that the resultant operational state of the wind turbine 10 tracks the desired references for the output variables. The second term corresponds to the variations of the controllable or independent variables, i.e., the commands controlling the wind turbine actuators. This term is used to avoid excessive activity of the actuators. Individual weights, $W_i$, are used to prioritize the performance goals of the controller by adjusting the cost function tuning weights. As a general rule, larger weight on the output variables provides aggressive reference tracking performance whereas larger weights on the controllable or independent variables provides a smooth control with improved robustness.

In an example of the disclosure, the cost function may be defined as follows:

$$ J = \sum_{k=1}^{N} W_p(P - P_{ref})^2 + W_\omega(\omega - \omega_{ref})^2 + w_\theta\dot{\theta} + W_T\dot{T} $$

where the first two terms correspond the power, P, and rotor speed, w, tracking. In other words, the first two terms in this cost function ensure that the output variables track the respective reference values: $P_{ref}$ and $W_{ref}$. The remaining two terms are related to the independent or controllable variables blade pitch (q) and torque (T) or, specifically, to the rate of the pitch and the torque. These are included to characterize and penalize the activity of said controllable variables. Finally, individual weights ($W_i$) may be assigned to each of the terms to account for the relative importance of each of the variables.

As indicated, this cost function is presented just as an example as different output variables may be used to characterize the operational state of the wind turbine 10 and different controllable variables may be used for different wind turbine actuators.

In an example of the disclosure, the secondary load parameters may be included in the cost function, specifically the secondary load parameters may be included with a corresponding weight indicative of the relative importance of the secondary load parameter. Furthermore, in variants of the example, the constraints defined for the secondary load parameters may comprise at least an upper bound and a slack variable, the slack variables being penalized in the cost function.

According to this example, the constraints associated to the secondary load parameters may be included as soft constraints in the optimization problem. Thus, constraints set on secondary load parameters may result in unsolvable optimization problems if included in the problem as hard constraints. In order to prevent such situation, constraints may be included as soft constraints by using a slack variable. The corresponding constraints may be implemented by defining an inequality constraint including the slack variable in the problem and by adding a term in the cost function to penalize the slack variable. The size of the slack variable may correspond to the size of the associated constraint violation. By adding the slack variable in the cost function, the optimization problem solver may search for an optimum trajectory while keeping the slack, i.e. the constraint violation, as small as possible.

Thus, in generic form, a constraint for secondary load parameter, LP, may be defined by an inequality constraint as follows:

$$ LP \leq UB + \varepsilon $$

14 where UB represents the upper bound for the respective secondary load parameter, LP, and e is the slack associated to the secondary load parameter. A modified generic cost function may be obtained by adding the slack variable in the previously mentioned cost function as shown in the following expression:

$$ J = \sum_{i=1}^{N} W_{x_i}(r_i - x_i)^2 + \sum_{i=1}^{M} W_{u_i}\Delta u_i^2 + W_{LP}\varepsilon^2 $$

where $W_{LP}$ represents the weight for the associated secondary load parameter, LP, which is indicative of the relative importance of the corresponding secondary load parameter. Also in this example, the slack is introduced in the form of a quadratic function. Nevertheless, this is just an example as other functions, f(e), may be used, provided they are monotonically increasing functions of e.

While defining the constraints for the secondary load parameters as soft constraints, the respective value of the upper bound, UB, and the slack, e, may be adjusted to achieve the desired behavior of the controller.

In other examples of the disclosure, the secondary load parameters may be added in the cost function as one of the tracking members of the cost function. In other words, a certain value may be defined for a specific secondary load parameters and a term equivalent to those listed above for output power or rotor speed may be included in the cost function for a secondary load parameter.

In examples of the disclosure, the constraints defined for the secondary load parameters may be based on material limits of one or more wind turbine components. Indeed, material limits of the wind turbine components may be used as constraints in the optimization problem as they should not be exceeded. As shown below, secondary load parameters indicative of materials limits may be given in terms of different magnitudes: forces, moments, stress, strain, etc.

Furthermore, as already presented in relation to FIGS. 1 and 2, a wind turbine 10 is a complex system with a very large number of components. Each of those components may be manufactured with different materials and may be subjected to different operating loads. Consequently, the material limits may be given in different form for different components. In examples of the disclosure, the components may include blades, tower, hub, bedplate, foundation, etc.

In an example of the disclosure, the secondary load parameters may be predetermined, more specifically, the secondary load parameters may be predetermined on the basis of a finite element method analysis of selected components of the wind turbine 10. According to this example, the decision on which secondary load parameters are used as constraints for the optimization problem may take place a priori. Based on that decision, the strength calculation module 732 may be programmed and it may include expressions to calculate the value of the selected secondary load parameters. The determination of the value of the secondary load parameters may comprise a calculation and a linearization of said calculation. The linearization may allow online calculation so that the secondary load parameters may be used by the optimization algorithm in an efficient manner during real time operation of the wind turbine 10. This may be particularly the case for especially complex secondary load parameters.

Detailed simulations may be carried out during the design phase of the wind turbine 10 for each of the most relevant components. More specifically, simulations may be carried out with Finite Element Method (FEM) models. In this manner, the secondary load parameters defining the true mechanical limits of the respective components of the wind turbine 10 may be identified.

As already indicated, different secondary load parameters may be used depending on the needs of the wind turbine 10 and its operating conditions. In examples of the disclosure, the predetermined secondary load parameters may comprise at least one of a force, a moment, a stress, a strain or a buckling load. More specifically, the secondary load parameters may comprise a stress at a wind turbine component derived by means of a stress tensor or a strain of a wind turbine component derived by means of a strain tensor.

Design limits may by defined by a secondary load parameter referring only to a force or a moment at a certain location of a wind turbine component. In such case, a soft constraint may be defined as:

$$\text{Force or Moment}_x \leq UB + \varepsilon$$

where "Force or Moment$_x$" simply represents the value of a selected force or moment for a component "x" of the wind turbine 10. In such cases, a function of multiple components of the forces or moments may be used. To this end, the three-dimensional forces ($F_x$, $F_y$, $F_z$) and three-dimensional moments ($M_x$, $M_y$, $M_z$) may be represented by the resultant, R:

$$R = f(F_x, F_y, F_z, M_x, M_y, M_z)$$

The limiting secondary load parameter may then be obtained as a function of the resultant, R. Furthermore, multiple resultants at different locations of the component may be employed to derive the secondary load parameter. Consequently, the corresponding constraint may be generally defined as:

$$\text{LP\_i}(R_1, R_2 \dots R_N) < UB_i \quad i = 1, \dots, p$$

where LP_i represents a certain secondary load parameter for a wind turbine component out of p different secondary load parameters and $R_1 \dots R_N$ represent the resultant forces and moments at N different locations. Finally, $UB_i$ represents the upper bound for the corresponding secondary load parameter LP_i.

In examples of the disclosure, the secondary load parameters derived from the resultants, R, may be given in terms of stresses or strains. Thus, a wind turbine component may be subject to normal forces, shear forces, bending and torsional moments. The state of loading of a portion of a component may be calculated from the resultants, R, using standard techniques in elasticity engineering. From those calculations, the stress (s) tensor or strain (e) tensor may be derived:

$$\sigma(x,y,z) = f(F_x, F_y, F_z, M_x, M_y, M_z)$$

$$\varepsilon(x,y,z) = g(F_x, F_y, F_z, M_x, M_y, M_z)$$

These tensors represent the structural state of the component. Safety of a structural component under combined loading conditions may require that the material of that component does not go beyond a critical stress or critical deformation. Such constraints may be expressed in the optimization problem as:

$$F < F_{cr}$$

where F represents a secondary load parameter that is a function of stress, strain or other loading factors of a component at a specific location of its geometry. Several criteria may be used to express the limit value, $F_{cr}$, which may depend on the limiting state for a given material. Some of these options include that $F_{cr}$ corresponds to a maximum principal stress, a maximum shear stress, a maximum principal strain, a maximum strain energy or a maximum shear strain energy. This general formulation may provide enhanced flexibility to handle limiting conditions corresponding to different types of materials in different wind turbine components. In examples of the disclosure, composite materials may be considered. This may be the case when handling blade delamination limits in blade composites. In such case, the secondary load parameters, F, may correspond to the complementary strain energies.

Figure 5:
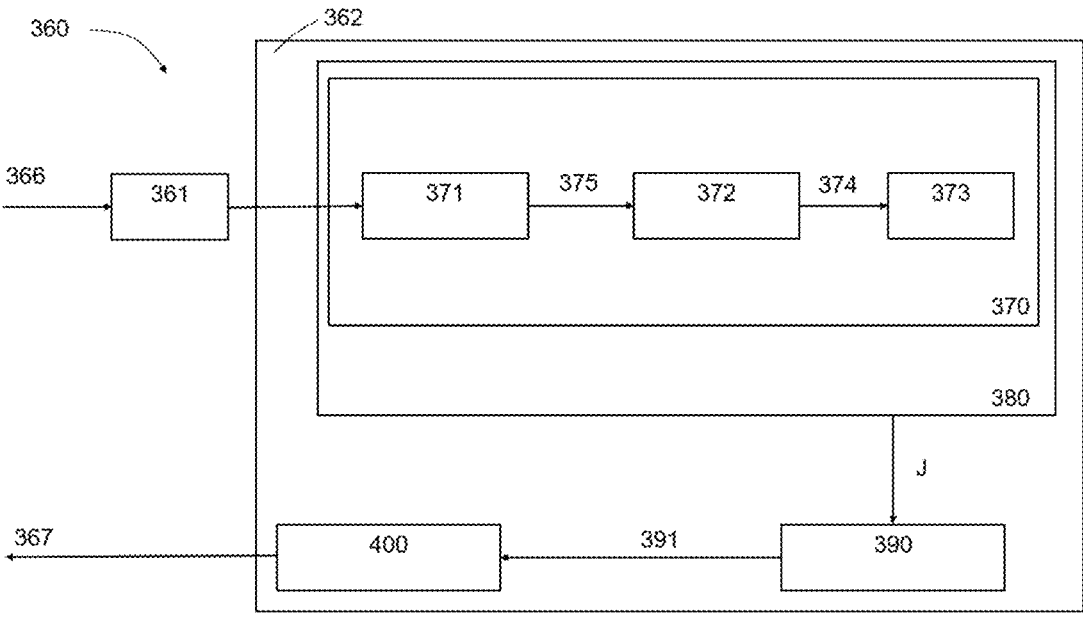
FIG. 5 schematically illustrates a controller comprising a strength calculation module according to an example.

FIG. 5 provides a more detailed view of an example of a controller 360 to carry out a method like the one described above. As shown in the figure, the control system 360 may be implemented by using a model predictive control (MPC) module 362. As previously indicated, an estimator 361 may be used to characterize the operational state of the wind turbine 10. The operational state of the wind turbine 10 is fed to the control model 370 in the MPC module 362. A predictive aeroelastic control model 371 is used to determine certain primary loads 375 for selected components and locations of the wind turbine 10. The primary loads 375 may be expressed in some cases as deflections of certain components of the wind turbine 10. The strength calculation module 372 uses the primary loads 375 from the predictive aeroelastic control model 371 to calculate the value of the secondary load parameters 374. Said secondary load parameters 374 may be associated to corresponding constraints for the optimization problem, which may be defined in a corresponding constraints module 373.

The secondary load parameters 374 calculated at the strength calculation module 372, together with the corresponding constraints obtained from constraints module 373, may be used by an optimization problem builder 380 to create the cost function, J. The optimization problem builder 380 is understood as an algorithm that builds a cost function, J, by taking into account the penalty terms for the different constraints, their relative relevance (i.e. the weights of each constraint in the cost function) and the corresponding values.

Furthermore, as also shown in FIG. 5, an optimization problem solver 390 may be used to find the optimum trajectory 391. An optimization algorithm may be used to find the optimum solution, i.e. the optimum set of independent or controllable variables that minimizes the cost function, J, at the corresponding control step. The optimum trajectory 391 resulting from the optimization may then be fed to block 400, which may take the first value of the calculated optimum trajectory 391 for each of the wind turbine actuator to generate the commands 367 to control one or more wind turbine actuators in the wind turbine actuator system 364. As indicated, FIG. 5 is just an example of an architecture to implement a method according to the disclosure. The details of the controller 360 may differ in other variants. For instance, as a non-limiting example, some of the actions defined for the different modules may be combined in a single module.

In a further example of the disclosure, the predicted values of the secondary load parameters 374 and/or the determined primary loads 375 may be stored and compared with actually measured values so as to evaluate a quality of the prediction. Specifically, the quality of the prediction may be characterized by, e.g. a mean prediction error, $E_m$, between the predicted values and the actually measured values. The variation of the prediction error, $E_v$, may also be considered. Both $E_m$ and $E_v$ may be evaluated over a certain time interval.

Figure 6:
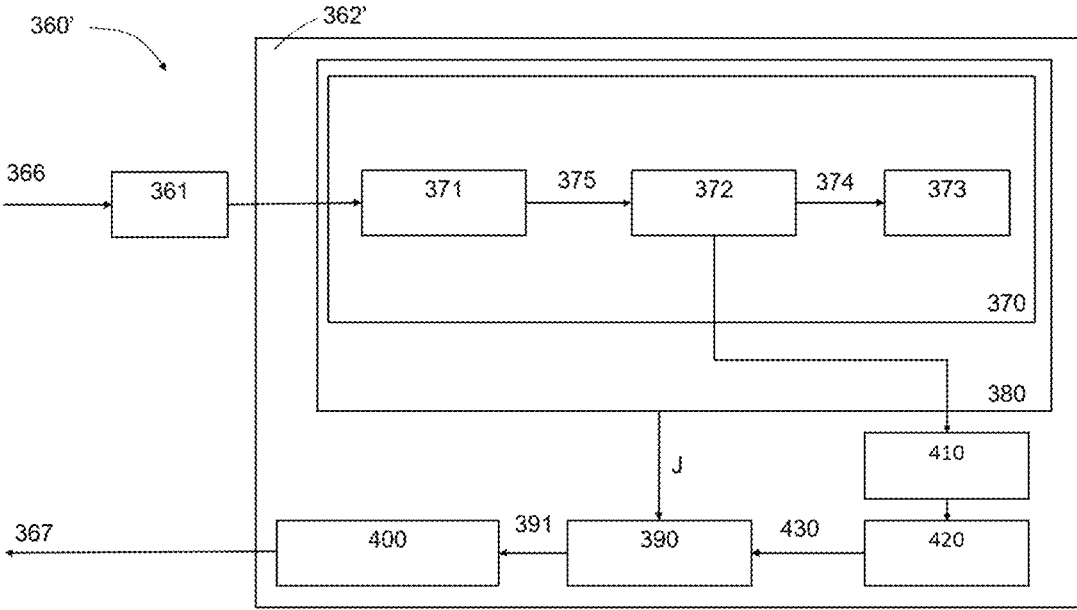
FIG. 6 schematically illustrates a controller comprising a strength calculation module according to a further example.

This additional capability may provide better online adaptation of the MPC controller to time-varying wind uncertainties and/or model mismatch, thus yielding improved tradeoff between load handling and energy production. FIG. 6 provides an overview of an example of a further controller 360' wherein said functionality may be provided.

In order to take the quality of the prediction into account, a modified MPC module 362' may incorporate a strength calculation module monitoring block 410, which may be employed to determine the quality of the prediction, e.g. to determine $E_m$ and $E_v$ for one or more of the secondary load parameters 374 or primary loads 375 To this end, the evolution of the prediction error, E, over a time interval may be calculated as the predicted value minus the actually measured value. Subsequently, the obtained E values may be processed to derive $E_m$ and $E_v$. In particular, the mean prediction error, $E_m$, may be obtained by, e.g. averaging E over the time interval or by applying a low-pass filter to the obtained E values. As for the variation of the prediction error, $E_v$, this may take different forms, e.g. maximum absolute error or standard deviation of E.

A strength adaptation module 420 may be provided to adjust different parameters of the optimization problem based on the results of the quality assessment conducted in block 410. Said modified parameters 430 may be provided to the optimization problem solver 390.

In some examples, the quality of the prediction may be used to adjust or correct the value of the secondary load parameters 374.

Furthermore, as previously indicated, the cost function may include terms for the slack of the constraints associated with the secondary load parameters 374. The weight for each constraint may be indicative of the relative importance of the respective secondary load parameters 374. In examples of the disclosure, the evaluation of the quality of the prediction may be used to update the weight of the slack components associated to the corresponding secondary load parameters 374. Thus, in said examples, the modified parameters 430, resulting from the adaptation module 420, may correspond to modified weights of said slack components in the cost function According to this example, the relative importance of a secondary load parameter 374 may be adjusted, not only on the basis of the effect of that particular load on a certain wind turbine component, but also on the basis of the reliability of the own controller to properly account for that secondary load parameter 374.

In other examples, the quality of the prediction may also be used to adjust a constraint, i.e. to adjust the value of a bound of a constraint, defined for a secondary load parameter 374. Accordingly, the bounds may be adjusted based on the mean prediction error, $E_m$, and/or the variation of the prediction error, $E_v$. Furthermore, the bounds for the respective constraints may also be adjusted depending on the distance between the actually measured value and the currently defined bound value. Consequently, in such examples, the modified parameters 430 may comprise the modified values for the bounds (either upper, UB, or lower, LB) of the constraints defined for secondary load parameters 374.

In a particular example, a constrained secondary load parameter, $LP_i$, may be limited with an original upper bound, $UB_i$:

$$LP_i < UB_i$$

Said constraint may be adjusted with a modified upper bound, $UB_i^*$:

$$LP_i < UB_i^*$$

Similarly, the original constraint may be included in the cost function, J, with a certain weight, $W_{LPi}$, which may be adjusted to a modified weight, $W^*_{LPi}$.

The expressions for the modified upper bound and modified weight may be given by:

$$UB_i^* = UB_i + E_m - f(E_v, UB_i - LP_i)$$

$$W_{LPi}^* = g(W_{LPi}, E_v)$$

wherein $f(E_v, UB_i - LP_i)$ is a non-negative function that adjusts the upper bound of the constraint based on variations of the prediction error, $E_v$, and on the distance between the measured value, $LP_i$, and its original upper bound, $UB_i$. The function f is non-decreasing with respect to $E_v$ and non-increasing with respect to $UB_i - LP_i$. On the other hand, the function g may be a non-negative function that modifies the original slack penalty weight based on a variation of the prediction error, $E_v$.

In cases where the constrained secondary load parameter 374 is bounded from below, i.e. with a condition of the type: $LP_i > LB_i$, wherein $LB_i$ corresponds to a lower bound, an equivalent process may be applied except that the expression for the modified bound may be as follows:

$$LB_i^* = LB_i + E_m + f(E_v, LP_i - LB_i)$$

In other examples of the disclosure, an equivalent process to the one described for secondary load parameters 374 may be carried out for primary loads 375. Thus, in examples comprising constraints also for primary loads, the predicted and actual values for primary loads 375 may be used to evaluate the quality of the prediction and to adjust the corresponding constraints.

In another example of the disclosure, the bounds of the constraints defined for different secondary load parameters 374 may be adjusted selectively in dependence of at least one of an operational state of the wind turbine 10, an operating mode of the wind turbine 10 or an environmental condition. In particular, certain constraints may be more relevant during startup, or shutdown, or at a particular wind regime such as a wind gust, extreme turbulence or large wind direction changes. This example of the disclosure may then be better adapted to handle such situations. In a variant of this example, a supervisory module may be included which may be configured to provide the information on, e.g. the operating mode of the wind turbine 10, so as to adjust the different constraints.

In still further examples, the constraints defined for different secondary load parameters 374 may be selectively activated or deactivated according to at least one of the operational state of the wind turbine 10, an operating mode of the wind turbine 10 or an environmental condition. Thus, in this example, not only the constraints may be adjusted to the conditions but they may be removed. As in the previous example, in a variant of this example, a supervisory module may be configured to add or remove constraints adaptively, i.e. based on the identification of the current operational state of the wind turbine 10 or its operating mode. This may be particularly advantageous in those operating modes wherein certain constraints may not play a significant role, e.g. constraints related to power output while in idling operating mode. By removing unnecessary constraints from the optimization problem, a more efficient operation of the controller may be achieved.

Some specific examples concerning different secondary load parameters 374 and the benefits of the present disclosure will be presented below with reference to FIGS. 7-12.

One of the most critical components in a wind turbine 10 are the blades 22. Specifically, the blade root area 24 is known to suffer significant loads during wind turbine operation. For that reason, typical controllers have been known to handle blade loads by adding a constraint on the blade flap moment, $M_{flap}$. However, inventors have identified that using the blade flap moment may not be representative of the true limiting conditions for the blade 22 as the maximum stress may be better characterized by a different secondary load parameter.

Figure 7:
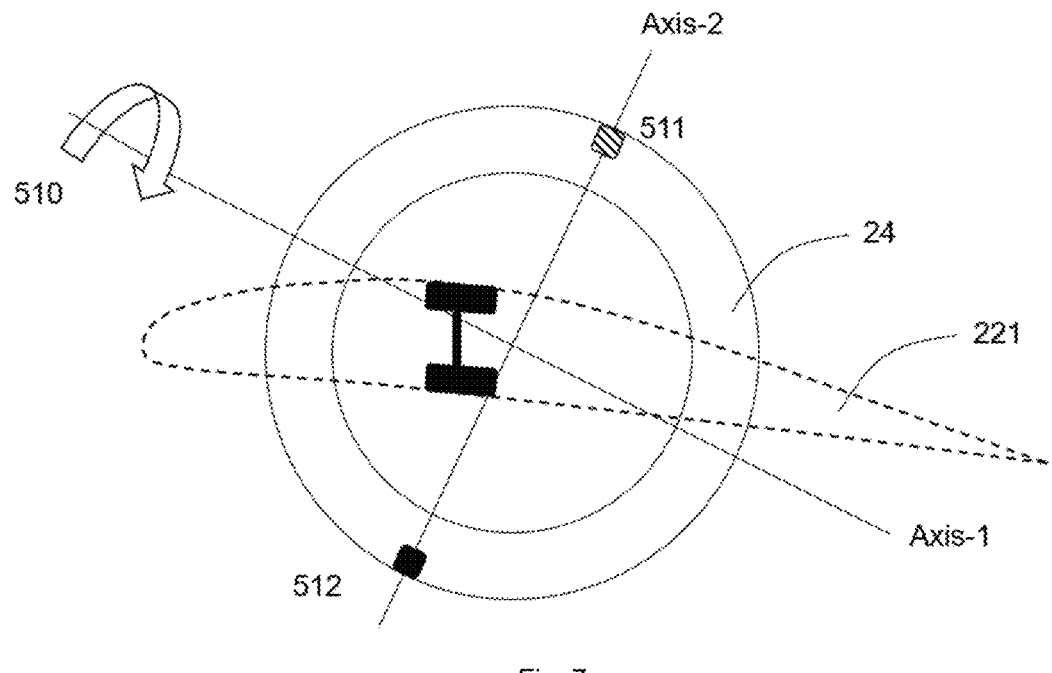
FIG. 7 schematically illustrates bending moments at the root of a wind turbine blade.

Accordingly, FIG. 7 schematically illustrates the resultant moment, $M_{resultant}$ 510, acting at the blade root 24 of a wind turbine blade 22 in the absence of other forces or moments. The blade cross-section ad mid-span 221 is also presented (dash line). Thus, given the bending moments $M_x$ and $M_y$ around any two orthogonal axes at the blade root 24, the resultant moment is given by: $M_{resultant}=\sqrt{M_x^2+M_y^2}$. The points of maximum tensile stress 511 and maximum compression stress 512 at the blade root 24 are represented in FIG. 7.

Figure 8:
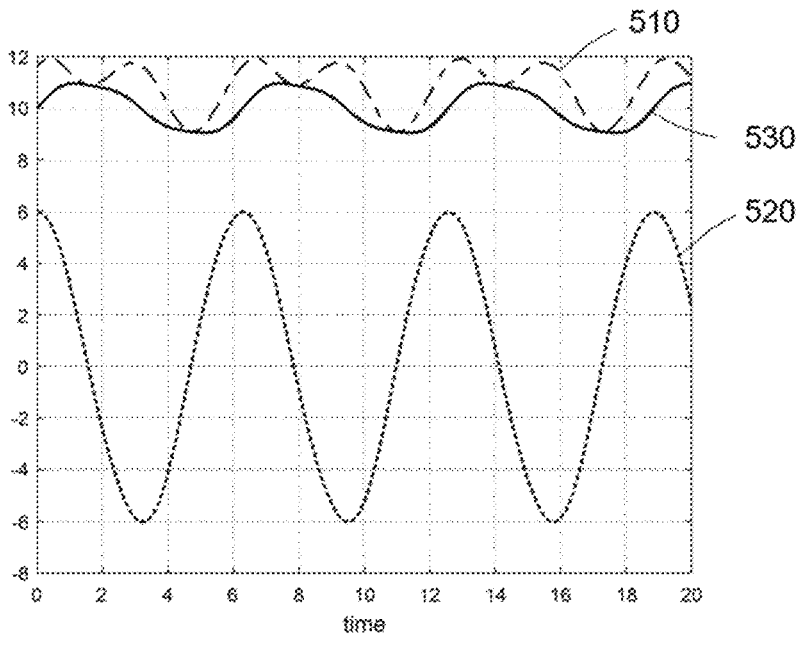
FIG. 8 schematically illustrates the evolution of the edgewise moment, the flap moment and the resultant moment at the root of a wind turbine blade.

FIG. 8 illustrates a typical scenario of the edgewise moment, $M_{edge}$ 520, the flap moment, $M_{flap}$ 530, and the resultant moment, $M_{resultant}$ 510, at the blade root 24 of a wind turbine blade 22. The maximum stresses calculated at the times when $M_{flap}$ 530 is maximum are lower than the maximum stresses calculated when the $M_{resultant}$ 510 is maximum. Consequently, a constraint based on $M_{flap}$ 530 may not ensure that worst-case scenarios are contained within limits so that it may leave the blade 22 exposed to failure. Thus, a controller based on $M_{flap}$ 530 may indicate that loads are within limits even when, in reality, they are not and the true constraint ($M_{resultant}$ 510) is not being considered.

Thus, in examples of the disclosure, the method may be such that one of the secondary load parameters may comprise a resultant moment at a blade root 24 of at least a wind turbine blade 22. By using the strength calculation module 372 to calculate the value of the resultant moment, $M_{resultant}$, at the blade root 24, and by using this resultant moment as one of the secondary load parameters in the optimization problem, a better performance than when using $M_{flap}$ may be obtained. The new constraint may reflect the truly limiting conditions of the wind turbine 10 in a more accurate manner. A constraint may then be defined for the resultant moment, $M_{resultant}$:

$$M_{resultant} \leq UB + \varepsilon$$

where UB is the upper bound for the resultant moment at the blade root 24 and e is a slack used to soften the constraint. Accordingly, the cost function, J, for the optimization algorithm may be adapted by adding a corresponding term. Thus, in an example of the disclosure, a cost function may be defined as follows:

$$J = \sum_{k=1}^{N} W_p(P-P_{ref})^2 + W_\omega(\omega-\omega_{ref})^2 + W_\theta\dot\theta + W_T\dot T + W_{eMRB}\big[(\varepsilon_{MRB1})^2 + (\varepsilon_{MRB2})^2 + (\varepsilon_{MRB3})^2\big]$$

where the first four terms are the same as the ones already explained above and a new term is included to account for the soft constraints added for the resultant moment at the blade root 24. In this case, a three-blade wind turbine 10 is considered, so MRBi represents the resultant moment at blade "i". Furthermore, a weight, $W_{eMRB}$, is provided to indicate the relative importance of this newly added soft constraint in the optimization problem.

Figure 9:
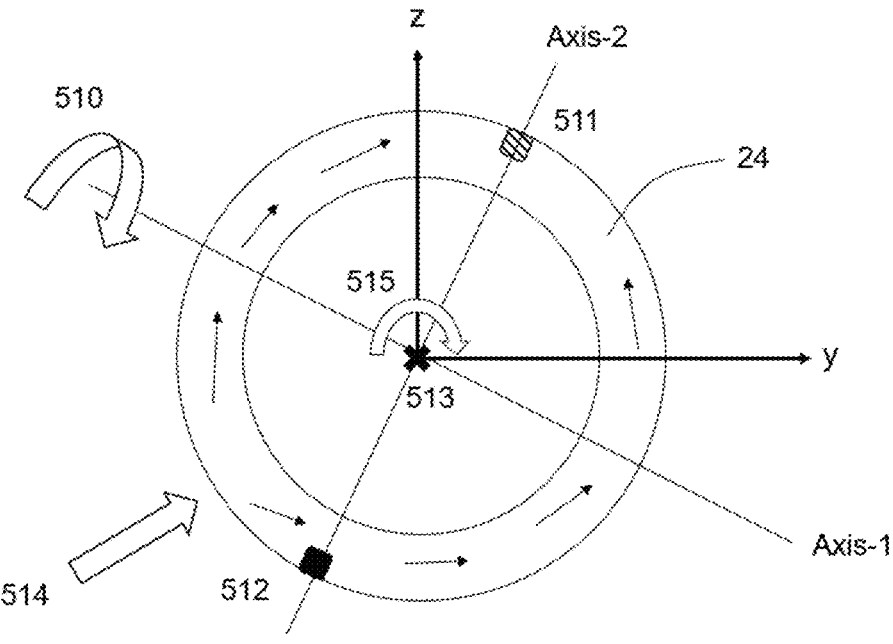
FIG. 9 schematically illustrates moments and forces acting on the root of a wind turbine blade.

Nevertheless, blade loads may be more complex, so secondary load parameters may be defined in further examples of the disclosure to capture true limiting loads in a more accurate manner. Indeed, as shown in FIG. 9, not only the resultant moment, $M_{resultant}$ 510, may influence the stress at the blade root 24, but also axial force at blade root, $F_x$ 513, shear force at blade root, Shear 514, and torsional moment at blade root, $M_x$ 515, may be taken into account. Consequently, in some examples of the disclosure, one or more of the secondary load parameters may be derived as a function of a collection of three-dimensional forces ($F_x$, $F_y$, $F_z$) and three-dimensional moments ($M_x$, $M_y$, $M_z$) at one or more locations of a wind turbine blade 22. More specifically, the one or more secondary load parameters may comprise at least one of a combination of a resultant blade moment 510 at the blade root 24 and an axial force 513 at the blade root 24, or a combination of a normal force, a shear force, a torsional moment, an edge moment and a flap moment at a specific blade section.

A combination of a resultant blade moment, $M_{resultant}$ 510, and an axial force, $F_x$ 513, may be used to account for the maximum stress at the blade root 24 of the wind turbine blade 22. Similarly to previous examples, a secondary load parameter may be derived by combining these two different inputs. A corresponding constraint may be formulated as follows:

$$LB - \varepsilon \leq K_1 M_{resultant} + K_2 F_x \leq UB + \varepsilon$$

where both an upper bound, UB, and a lower bound, LB, are defined. Furthermore, a slack (e) is given to both bounds to provide some softening to the constraint. Finally, different weights ($K_1$, $K_2$) may be provided to the resultant moment, $M_{resultant}$ 510, and to the axial force, $F_x$ 513, to reflect their relative importance on the stress at the blade root 24.

Figure 10:
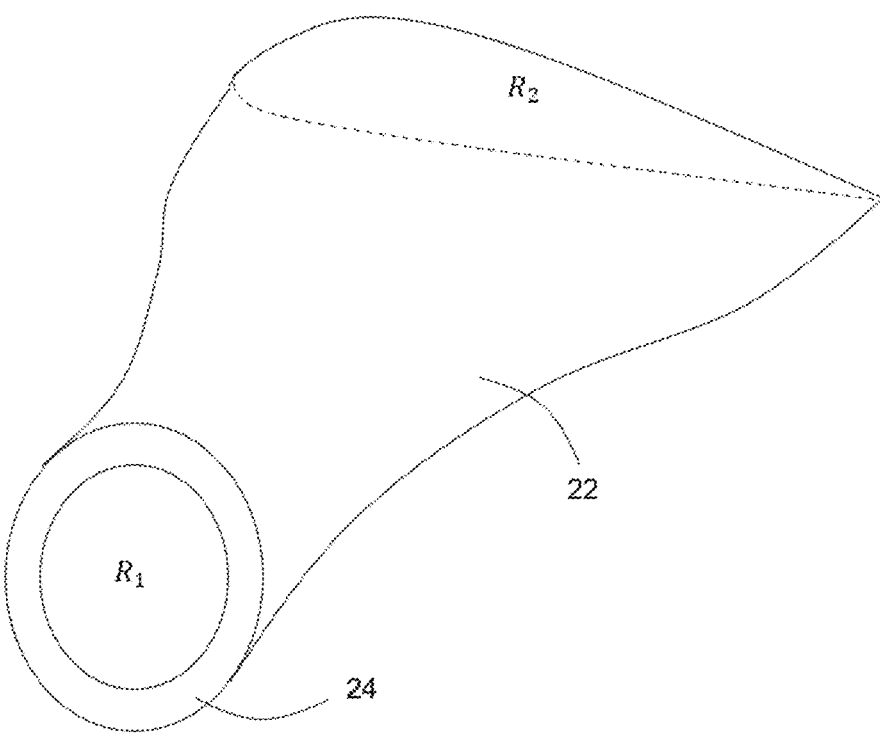
FIG. 10 schematically illustrate a wind turbine blade comprising two separate sections $R_1$ and $R_2$.

Other locations of the wind turbine blade 22 other than the root 24 may be subjected to limiting loads depending on the design of the wind turbine 10 and the blade 22. For instance, the limiting load for the blade 22 in another example of the disclosure may be a maximum stress in the spar cap at a specific blade section. In such case, a combination of the normal force, a shear force, a torsional moment and a flap moment may be determined at such specific blade section to account for a maximum stress at a spar cap of a wind turbine blade 22. More generally, examples of the disclosure may comprise determining the resultant, i.e. the collection of three-dimensional forces and three-dimensional moments, at multiple sections of the blade 22. FIG. 10 shows a schematic representation of a blade 22 wherein two sections are indicated. In each of those two sections, a resultant, R ($R_1$ and $R_2$), may be obtained:

$$R_i = \begin{bmatrix} F_{xi} \\ F_{yi} \\ F_{zi} \\ M_{xi} \\ M_{yi} \\ M_{zi} \end{bmatrix}$$

where i=1 . . . N represent the considered sections. A secondary load parameter may be derived for the blade 22 as a function of the corresponding resultants.

A constraint may be included for the associated secondary load parameter. In an example, the constraint may be included as a hard constraint:

$$L_{blade\,i} = f(R_1, \ldots, R_n) \leq UB$$

In other examples, the constraint may be softened by adding a slack variable:

$$L_{blade\,i} = f(R_1, \ldots, R_n) \leq UB + \varepsilon$$

Previously shown examples were concerned with secondary load parameters affecting wind turbine blades 22. Nevertheless, as understood by those skilled in the art and as already explained with reference to FIGS. 1 and 2, a wind turbine 10 comprises a very large number of mechanical and structural components. All such components exhibit mechanical limits and, consequently, examples of a method may be envisaged to account for secondary load parameters affecting other components.

Figure 11:
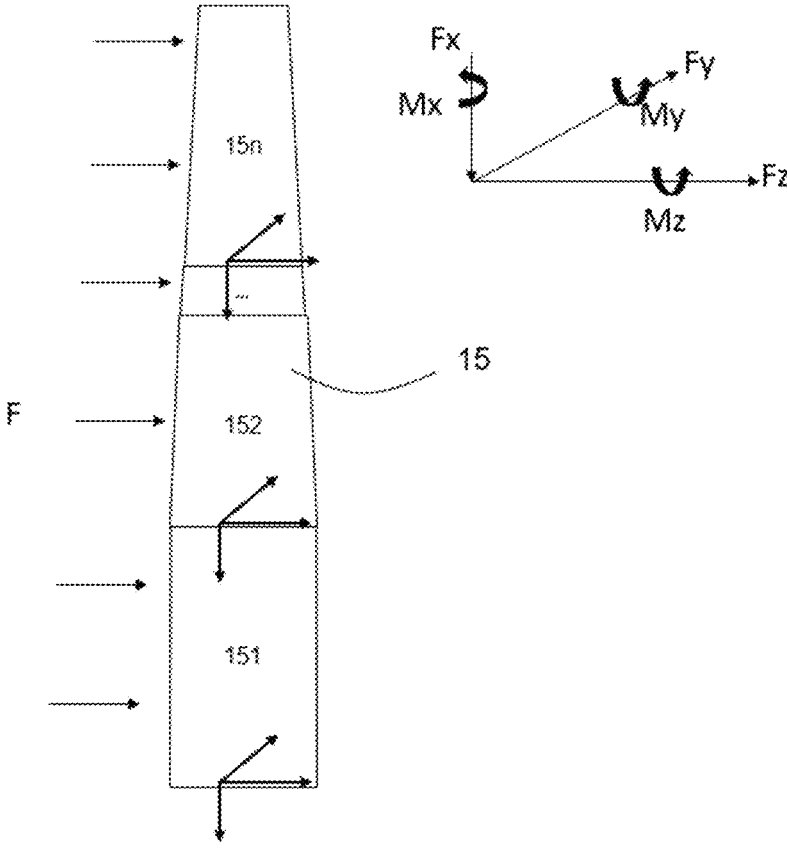
FIG. 11 schematically illustrates an example of a wind turbine tower comprising multiple sections with forces and moments applied at each section.

FIG. 11 schematically illustrates an example of a wind turbine tower 15 comprising multiple sections 151-15$n$ with forces and moments applied at each section. In examples of the disclosure, the secondary load parameters may comprise a combination of compression, bending and torsional loads at one or more sections of a wind turbine tower 15.

The load for combined compression, bending and torsion of wind turbine tower sections 151-15$n$ can also be a limiting factor for the design and operation of a wind turbine 10. Each section of the tower 15 may have different diameter, thickness, stiffeners, bolted joints or materials. Furthermore, the loading condition of each section 151-15$n$ may also be different. Accordingly, critical loads for different tower sections may differ. The limiting loads for each section may be a combination of maximum stress, maximum deformation or buckling loads. Therefore, in an example of the disclosure, the tower constraints may be defined based on a plurality of secondary load parameters defined for the limiting loads at each section. Said secondary load parameters may be calculated in the strength calculation module 372 so that an accurate representation of the strength of the tower 15 during operation may be obtained.

As a further example of the disclosure, secondary load parameters may comprise at least one of a maximum tensile stress, a maximum shear stress or a maximum shear deformation energy at one or more locations of a wind turbine hub 20. More specifically, the maximum tensile stress, the maximum shear stress and the maximum shear deformation energy may be calculated with a stress tensor after considering three-dimensional forces and moments from each wind turbine blade 22 connected the hub 20 and from the connection to a main shaft 44 of the wind turbine 10.

Figure 12:
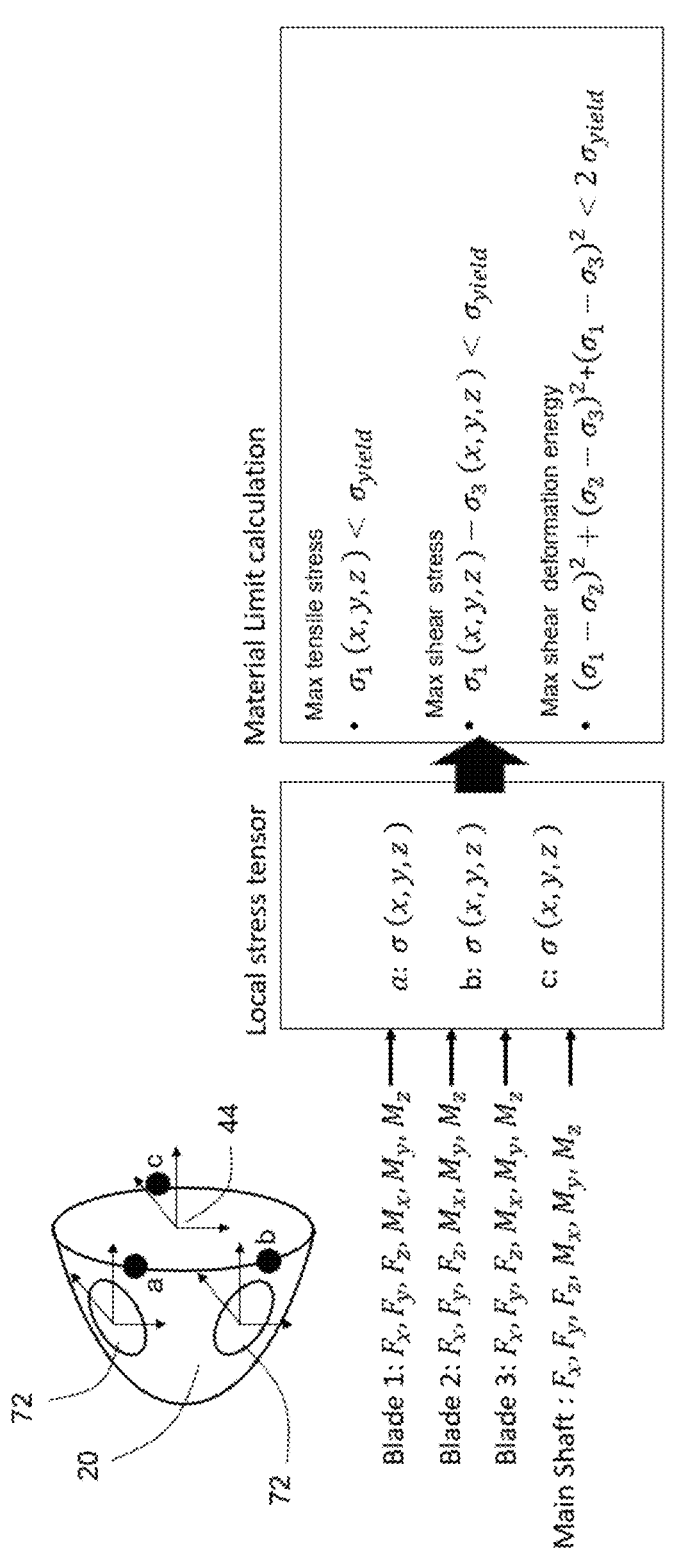
FIG. 12 schematically illustrates an example of a wind turbine hub with forces and moments applied at the connection of the hub with the wind turbine blades and with the main shaft.

In that regard, FIG. 12 shows a schematic image of wind turbine hub 20 and the corresponding loading. External forces and moments may be exerted on the hub 20 by each of the three pitch bearings 72 and by the connection to the main shaft 44. The resultants, comprising three-dimensional forces and moments for each of these locations, may be obtained. The strength calculation module 372 may then calculate a corresponding secondary load parameter at specific locations of the hub 20. Said locations may correspond to the locations of the hub 20 that are subjected to the most significant loads. These locations may be predetermined by means of an analysis by, e.g. FEM. For each of the predetermined locations of the hub 20, a secondary load parameter may be derived and a corresponding constraint may be defined as:

$$F(R_{blade1}, R_{blade2}, R_{blade3}, R_{MainShaft}) < F_{cr}$$

where $R_{blade\,i}$ is the resultant of three-dimensional forces and moments at the corresponding pitch bearing connection to the hub 20 and $R_{MainShaft}$ is the resultant of three-dimensional forces and moments for the connection to the main shaft 44. Said forces and moments may be obtained with a basic aeroelastic model.

The strength calculation module 372 in this case may calculate the limiting condition for the hub material at selected locations: a, b and c in FIG. 12. To this end, the resultants for the three blades 22 and the main shaft 44 may be fed to the strength calculation module 372. The strength calculation module 372 may comprise the local stress tensors at the selected predetermined locations. From the resultants, R, and the stress tensors, the limiting condition may be derived. In examples of the disclosure, different limiting conditions may be selected to account for the different characteristics of the material. Thus, the maximum tensile stress, the maximum shear stress or the maximum shear deformation energy may be selected. In all cases, a maximum stress, $s_{max}$, may be defined as an upper bound for the selected stress. In examples comprising ductile materials, $s_{max}$ may correspond to the yield strength, $s_{yield}$. This is the case in the example shown in FIGS. 12, in which this maximum tension corresponds to the yield stress limit, $s_{yield}$, of the hub material, which may then be used to define the corresponding constraint. As understood by those skilled in the art, different limit conditions may be defined for different components based on the corresponding materials.

According to another aspect of the disclosure, a controller 360 for a wind turbine 10 is provided. The controller 360 is configured to carry out method for controlling a wind turbine 10 according to previously explained method examples or any further equivalent examples. The control system 360 may be implemented as part of the wind turbine controller 36.

According to another aspect of the disclosure, a wind turbine 10 comprising a tower 15, a nacelle 16 rotatably mounted on top of the tower 15, a wind turbine rotor 18 including a plurality of wind turbine blades 22 and a yaw system may be provided. The wind turbine may comprise a control system 360 configured to perform the methods as described throughout this disclosure or any equivalent examples (including combinations).

This written description uses examples to disclose the teaching, and also to enable any person skilled in the art to practice the teaching, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various examples described, as well as other known equivalents for each such aspects, can be mixed and matched by one of ordinary skill in the art to construct additional examples and techniques in accordance with principles of this application. If reference signs related to drawings are placed in parentheses in a claim, they are solely for attempting to increase the intelligibility of the claim, and shall not be construed as limiting the scope of the claim.

The invention claimed is:

1. A method of controlling a wind turbine having a plurality of wind turbine actuators, the method comprising the following steps:

receiving operational data of the wind turbine;

based on the received operational data, estimating an operational state of the wind turbine; using a control model to predict potential operational states of the wind turbine depending on operation of the wind turbine actuators over a finite period of time, wherein the control model comprises a predictive aeroelastic control model to determine primary loads based on the received operational data, the control model further comprising a strength calculation module to calculate one or more secondary load parameters based on one or more of the primary loads, constraints being defined for the one or more secondary load parameters, the one or more secondary load parameters comprising at least one of the following: a force, a moment, a stress, or a strain;

optimizing a cost function over a finite optimization period of time, subject to the constraints, to determine an optimum trajectory comprising commands for the wind turbine actuators; and using the first commands of the determined optimum trajectory to control the wind turbine actuators.

2. The method of claim 1, further comprising repeating the steps at consecutive control intervals.

3. The method of claim 1, wherein constraints are defined for one or more of the primary loads, and optimizing a cost function over a finite optimization period of time is subjected to the constraints defined for the primary loads.

4. The method of claim 1, wherein the one or more secondary load parameters are included in the cost function, wherein the one or more secondary load parameters are included with a corresponding weight indicative of a relative importance of each of the one or more secondary load parameters, and wherein the constraints defined for the one or more secondary load parameters comprise at least an upper bound and a slack variable, the slack variables being penalized in the cost function.

5. The method of claim 1, wherein the constraints defined for the one or more secondary load parameters are based on material limits of one or more wind turbine components.

6. The method of claim 1, wherein the one or more secondary load parameters are predetermined based on a finite element method analysis of selected components of the wind turbine.

7. The method of claim 1, wherein the predicted values of the one or more secondary load parameters or the determined primary loads are stored and compared with actually measured values to evaluate a quality of the prediction based on a mean prediction error over a time interval or by a variation of a prediction error over a time interval.

8. The method of claim 7, wherein the one or more secondary load parameters are included in the cost function with a corresponding weight indicative of a relative importance of each of the one or more secondary load parameters, and the evaluation of the quality of the prediction is used to update the weight of the one or more secondary load parameters or to update a bound of the constraint defined for the one or more secondary load parameters.

9. The method of claim 1, wherein the cost function comprises at least two reference tracking members related to power generated by the wind turbine and rotational speed of the wind turbine and at least two activity suppression members related to blade pitch and generator torque activity.

10. The method of claim 1, wherein bounds of the constraints defined for different of the one or more secondary load parameters are selectively adjusted in dependence of at least one of the operational state of the wind turbine, an operating mode of the wind turbine, or an environmental condition.

11. The method of claim 1, wherein the constraints defined for different of the one or more secondary load parameters are selectively activated or deactivated according to at least one of the operational state of the wind turbine, an operating mode of the wind turbine, or an environmental condition.

12. The method of claim 1, wherein the strength calculation module includes expressions to calculate a value of the one or more secondary load parameters, the expressions comprising a linearization of the calculation of the secondary load parameters.

13. The method of claim 1, wherein the commands to control the wind turbine actuators comprise a blade pitch actuator or a generator torque.

14. The method of claim 1, wherein one of the one or more secondary load parameters comprises a resultant moment at a blade root of a wind turbine blade.

15. The method of claim 1, wherein one or more of the one or more secondary load parameters are derived as a function of a collection of three-dimensional forces and three-dimensional moments at one or more locations of a wind turbine blade, wherein the one or more secondary load parameters comprise at least one of:

a combination of a resultant blade moment and an axial force; or a combination of a normal force, a shear force, a torsional moment, an edge moment and a flap moment at a specific blade section of the wind turbine blade.

16. The method of claim 1, wherein the one or more secondary load parameters comprise a combination of compression, bending, and torsional loads at one or more sections of a wind turbine tower.

17. The method of claim 1, wherein the one or more secondary load parameters comprise at least one of a maximum tensile stress or a maximum shear stress at one or more locations of a wind turbine hub, wherein the maximum tensile stress or the maximum shear stress is calculated with a stress tensor after considering three-dimensional forces and moments from each wind turbine blade connected to the wind turbine hub and from the connection to a main shaft of the wind turbine.

18. A method of controlling a wind turbine having a plurality of wind turbine actuators, the method comprising:

receiving operational data of the wind turbine;

based on the received operational data, estimating an operational state of the wind turbine, the operational state being defined at least partially by a plurality of variables;

using a control model to predict potential operational states of the wind turbine depending on operation of the wind turbine actuators over a finite period of time, the control model further comprising a strength calculation module to derive one or more secondary load parameters based on the received operational data, and wherein constraints are defined for the one or more secondary load parameters, the one or more secondary load parameters comprising at least one of the following: a force, a moment, a stress, or a strain;

optimizing a cost function over the finite period of time, subject to the constraints, to determine an optimum trajectory comprising commands for the wind turbine actuators; and using the first commands of the determined optimum trajectory to control the wind turbine actuators.

19. A controller for the wind turbine, the controller configured to perform the method according to claim 18.

\* \* \* \* \*